May 13, 1924.
H. E. LA BOUR
1,493,756
METHOD OF AND MEANS FOR EVAPORATION BELOW EBULLITION POINT
Filed Aug. 1, 1919
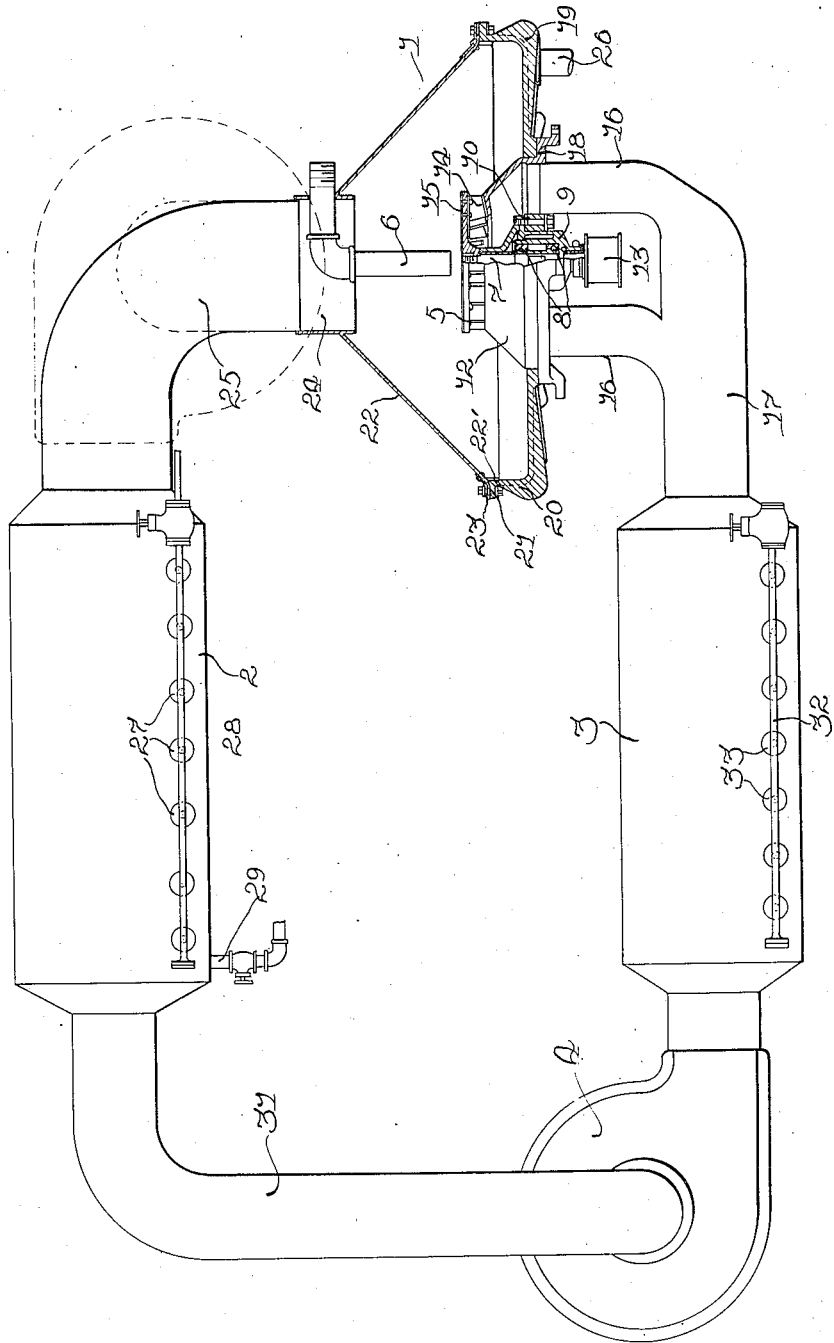
Inventor
Harry E. La Bour Patented May 13, 1924.

1,493,756

UNITED STATES PATENT OFFICE.

HARRY E. LA BOUR, OF CHICAGO, ILLINOIS, ASSIGNOR TO CHEMICAL EQUIPMENT COMPANY, OF CHICAGO, ILLINOIS, A CORPORATION OF ILLINOIS.

METHOD OF AND MEANS FOR EVAPORATION BELOW EBULLITION POINT.

Application filed August 1, 1919. Serial No. 314,634.

*To all whom it may concern:*

Be it known that I, HARRY E. LA BOUR, a citizen of the United States, residing at Chicago, in the county of Cook and State of Illinois, have invented a certain new and useful Improvement in Methods of and Means for Evaporation Below Ebullition Point, of which the following is a full, clear, concise, and exact description, reference being had to the accompanying drawings, forming a part of this specification.

My invention relates to an improved method of and means for causing evaporation below the ordinary ebullition point.

More particularly the invention provides a novel method of and means for de-alcoholizing beer at such a relatively low temperature that the flavoring of the beer is not destroyed. The invention is not, however, to be limited to this particular purpose, as it may be employed to the same advantage in extracting water or other liquids from various carrying liquids such as, for instance, water from fruit juice, milk, or sulphite liquors used in pulp mills, and all without undesirable results.

Many methods of separating one liquid from another, or de-hydrating substances held in solution are well known and I do not claim that my invention has such a wide scope. However, the methods now in common use have certain inherent deficiencies which are particularly noticeable when they are applied to the de-alcoholizing of beer, and I wish to point out some of the more patent thereof for the purpose of making clear the importance and scope of my present invention.

The principal feature of my invention, in which I am especially interested, is in its application to the de-alcoholizing of beer.

In reducing the alcoholic contents of beer many methods have been attempted and have been used to some extent, but heretofore they have been accompanied by such a loss of flavor as to prove fatal to the product. The flavoring substance in beer consists mainly of such highly volatile material that under the common heat treatment for the extraction of the alcohol this flavoring substance is either drawn off or destroyed.

Another difficulty has been that undesired chemical changes occur which destroy the flavor, color or other qualities of the beer. It has been found that the slowness of prior processes permit chemical changes or changes in physical structure or conditions, (such as undesirable coagulation or the like), which are deterimental. The heating incidental to prior processes has also proved destructive in other ways.

This present invention is a further development of and an improvement upon the invention disclosed in my co-pending application, Serial Number 310,373, filed July 12, 1919, and lies particularly in the use of a closed circulatory circuit of an inert gas, bringing the gas and liquid into intimate contact at one point in the circuit, at one side of the mixing point cooling the gas to remove the alcohol, at the other side of said point heating the gas to increase its absorptive qualities and maintaining an appreciably lower pressure on the cooling side than on the heating side whereby the capacity of any given apparatus is largely increased, the efficiency is increased, the percentage of alcohol removed in increased, and the delicate flavoring substances are not in any manner destroyed or deteriorated.

I not only preserve the flavoring substances while eliminating the alcohol, but I also overcome the undesirable effects heretofore encountered, namely the destructive effect of high temperature, the occurrence of undesirable chemical and physical changes; the loss of important constituents; uncontrollable variations of density or interaction; effects treacable to slowness of action; effects traceable to the introduction of foreign substances, such as dust, bacteria, etc.; the high cost and destructive action of vacuum pans; and the inability to employ an inert body of gas.

The advantages of my improvement are apparent. They include a very greatly increased rapidity of operation and capacity, complete control of operation at all times, cleanliness, efficiency, and numerous other factors which jointly and severally make possible results and effects not heretofore obtainable.

In the accompanying drawing I have illustrated diagrammatically the apparatus for carrying out my improved method. The apparatus is arranged in a closed cycle and comprises the mixing apparatus 1, wherein the beer is de-alcoholized; the cooling and condensing apparatus 2 wherein the alcohol constituents or vapor particles are removed from the gas; the heater 3, wherein the gas is reheated prior to its recirculation thru the mixing apparatus 1; and the pressure boosting apparatus or fan 4, which is arranged at some point in the circuit between the two sides of the de-alcoholizing or mixing apparatus, preferably as indicated in full lines in Figure 1 between the condenser and the reheater, but obviously may be arranged as indicated in dotted lines between the mixer and the condenser.

The mixing apparatus 1 is constructed generally in accordance with the disclosure in my prior application, Serial Number 227,206, which matured into Patent No. 1,318,774, certain improvements and refinements being added to the construction disclosed therein, as I shall presently describe. The beer is pumped or fed upon a revolving plate or spreading disk 5 as by means of the pipe 6, the beer being discharged upon the center of the plate 5. The disk 5 is mounted upon a spindle 7 which is supported in ball bearings 8—8 which in turn are supported in a cylindrical hub member 9. The hub member 9 is provided with a radial flange which is bolted upon the central annulus 10, which forms part of the conical casing 12. At the lower end the spindle 7 is provided with a pulley 13 or any other preferred driving means.

A series of impeller blades 14 are secured to the under side of the spreading disk 5. These impeller blades are constructed of sheet metal bent at right angles to provide a flange, for riveting to the disk 5, and the downwardly projecting impelling surface. The upper surface of the spreading disk 5 is faced with a thin plate 15, which is preferably composed of a material of non-corrosive character and which will have no chemical interaction with the liquid being pumped thereon. The series of impellers 14 function as a centrifugal pump for projecting the heated gas. The gas is drawn into the casing 12 at two diametrically opposite points thru branch conduits 16—16 which separate from the main conduit 17 extending from the heater 3. As the gas passes up into the casing 12 it is deflected inwardly by the frustro-conical wall thereof toward the spindle 6 and is then caught by the impeller blades 14 and is whirled out centrifugally between the disk 4 and the inwardly projecting flange on the casing 12.

The casing 12 constitutes a pressure chamber as its outlet is contracted by means of the inwardly projecting flange at its upper end and the flow of gas thru the outlet being further reduced or hindered by the plate 5 and the impeller, so that we have at this point a division in the circuit as to pressure, that is between the pressure chamber and the upper part of the casing of the mixing device to which I apply the vacuum effect of the condensation in the condenser and from the draught of the blower or fan 4.

The casing 12 is provided with a radial flange 18 which is bolted to the lower portion 19 of the main mixing chamber. The casing portion 20 consists of a ribbed casting, which is preferably provided with an annular bolting flange 21, to which is bolted the upper conical portion 22 of the mixing chamber. The conical portion 22 is preferably constructed of sheet metal having a downwardly projecting flange 22' engaging in the casing portion 20, and having riveted directly above said flange a separate bolting flange 23. At its upper end, the conical portion 22 is formed with a cylindrical portion 24 thru which is extended the pipe 6, and which communicates with the conduit 25 extending to the condenser 2. The lower casing portion 19 is provided with a discharge pipe 26 for conducting the beer from the mixing apparatus 1.

The operation of the apparatus thus far described is as follows:

The beer is pumped or otherwise discharged thru the pipe 6 upon the center of the revolving disk 5, which is rotated at high speed. Impinging on the center of the disk 5 the liquid spreads out uniformly over the disk, taking on a constantly increasing velocity. There is, however, a certain amount of slippage between the liquid and the plate. This causes the liquid film to partake not only of an outward velocity, but also of a rolling and rotary motion which puts the liquid into violent agitation so that as it spreads outwardly it breaks up into drops. These drops then have an outward and circular motion and also a planetary or rotary motion on their own individual axes. This I consider has a double effect; first, of causing continuous wiping action of the surface of the curtain of beer or other liquid, and the individual droplets upon the surrounding gas, and second the rotative motion of the particles develops a centrifugal effect, which tends, even if small, to overcome to some extent the surface tension of the liquid and permits the free liberation of the alcoholic content. It will be seen from this that a fluid curtain of considerable density can be formed, which will still permit the passage of gas between the rolling drops and at the same time force intimate contact between the liquid and the gas. This intimate mixing characteristic of the apparatus 1 is fully illustrated and described in my said allowed application.

The beer is whirled outwardly from the disk 5 in the form of a thin flat film which strikes against the conical casing 22, thus completing the liquid curtain entirely across the mixing chamber. Due to the conical shape of the casing portion 22, the liquid is deflected downwardly into the annular space in the casing portion 19. This space constitutes a quiescent zone or pocket wherein the liquid is removed from the action of the ascending gas.

I preferably make use of a gas which is inert, that is, which does not interact chemically with the beer. This inert gas may be carbon dioxide or any other gas having the property of volatilizing and carrying off the alcoholic constituents. On the other hand I may employ a gas having an initial chemical interaction with the beer, for the reason that such gas would soon become saturated, in the closed cycle, and would thereafter become neutral and have no further chemical action upon the beer. The gas issues from between the impeller blades 14 at a small angle to the line of discharge of the liquid from the disk 5. The curtain of liquid and the curtain of gas are thus brought into intimate contact for a relatively long period of their travels. The gases are heated in the heater 3 prior to admission to the mixing apparatus and furthermore the gases expand to a certain degree as they are impelled outward from the blades 14. As a consequence, the gases are in a heated, expanded condition when they come into intimate contact with the expanding film of beer and thus the two fluids are in ideal condition for effecting rapid vaporization. The expanded gases are necessarily at a relatively low pressure. From the fact that the gases circulate in a closed cycle, it will be apparent that the mean pressure of the gases can be varied to secure practically any desired expansion pressure in the mixing chamber. The vaporization of the alcohol is thorough, due to the relatively higher temperature of one fluid, to the relatively low pressure of both fluids, to the relatively low temperature of the beer, and to the fine atomization and intimate contact between both fluids. The gases or vapor, after passing thru the liquid film have a rotary motion in the same direction as that of the disk 5 and as a result they are thoroughly scrubbed against the conical wall above the liquid curtain, preventing entrainment of drops of liquid. This whirling motion of the gases continues in the discharge pipe and further subjects the gases to scrubbing and to precipitation of the entrained drops of liquid.

The gases or alcoholic vapors pass into the cooler and condenser 2, substantially free of all free liquid or drops thereof, where the alcohol vapor is condensed and removed from the circulating gas. The illustration of the condensing apparatus 2 is purely conventional, as it will be apparent that any preferred condenser may be employed. The cooling medium is circulated thru a plurality of cooling coils 27, which are supplied from a header 28 communicating with any controllable source of cooling fluid. Regulation of the degree of cold in the condensing apparatus 2, may be desirable for condensing the alcohol vapor to the exclusion of other vapors condensible at lower temperatures, or for condensing certain of these vapors if desired. The temperature of the condensing chamber 2 has a relation to the desired selective removal of the vapor constituents from the gas mixture. A discharge pipe 29 is provided for drawing off the condensed alcohol.

From the condensing apparatus 2 the gases pass into a conduit 31 in a cold dry condition, and through which they flow to the heating apparatus 3 through the fan 4. The heating apparatus may also be of any conventional construction; in the form shown the header 32 controllably supplying a heating medium to the heating coils 33.

In the heating apparatus 3, the temperature of the gas is raised to the point where it will effect the vaporization of the required percentage of alcohol with the least heating of the beer possible. The temperature to which the gas will be raised is controlled by several variable factors, namely: first, the temperature of the entering beer; second, the temperature of the outgoing gas, which should be of sufficient degree to retain the alcohol in vapor suspension; third, the quantity of gas circulated; fourth, the amount of alcohol or vapor removed by the gas; and fifth, the drop in pressure between the pressure chamber and the mixing chamber due to the forced circulation of the gas through the cycle and to the condensation of the discharged gases on one side and their reheating upon the other side. It is desirable in the operation of the process, to limit the variation of the temperature of the beer to as small a range as possible. This is preferably accomplished by so adjusting the temperature of the heated gas entering the mixing apparatus that the temperature of the entering beer, the temperature of the discharging beer, and the temperature of the outgoing gases or alcoholic vapor are substantially the same. This gives a maximum evaporative effect without the addition to or loss of temperature from the beer. The incoming gas is preferably heated in the heater 3 to a point which will sterilize the gases.

The effect of the condenser upon the gases is very marked. Both the elimination of the alcohol and the reduction in temperature of the gaseous vehicle serves to reduce the pressure of the gas at this point. This reduction in pressure extends back to the vaporization zone and materially assists in the evaporation of the alcohol. On the other hand the heater by expanding the gases increases the pressure and this extends to the gas chamber so that the hot gas when thrown into the mixing chamber will be in condition to expand and absorb the alcoholic content of the beer, becoming cooled thoroughly and dropping in pressure. I have found that while these variations in pressure in the circuit are of value, they are apt to be minimized by the equalization of the pressure through the circuit, the effect of the reduction of pressure produced in the condenser extending to the heater and vice versa.

The introduction of the fan prevents this equalization as the fan controls the flow in the circuit, drawing the gas through the condenser from the vaporization zone and pushing it through the heater to the mixing zone, thereby greatly augmenting the differences in pressure in various parts of the circuit and actually maintaining the pressure at the vaporization point very much lower than in the pressure chamber, which assists in the free and rapid liberation of the alcohol from the liquid and greatly increases the capacity of the device. The arrangement of the fan 4 between the condenser and heater is very advantageous as the volume of gas to be handled is at a minimum at this point. On the other hand there are certain advantages to be secured in placing the fan as shown in dotted lines between the mixing device and the condenser, namely that the vacuum effect of the fan is transmitted more directly to the vaporization zone and a lower vacuum can be attained and the further advantage of maintaining the condenser under a pressure instead of under a slight vacuum, thereby hastening the removal of the alcohol from the gas.

While it is true that the closed cycle without the fan or pressure device 4 will operate practically and de-alcoholize beer, I have found that the addition of the fan greatly increases the capacity of the apparatus for effecting the de-alcoholizing of beer and makes it possible to very easily reduce the alcoholic contents below one-half of one per cent, or practically eliminate it entirely. Furthermore, the rapid and forced circulation of the gases around the circuit by reason of the fan maintains the condenser under a substantial vacuum and produces a desired pressure in the pressure chamber, in accordance with the adjustment of the several factors, namely the capacity of the fan and its speed, the temperature of the reheated gases and the proportionate area of the outlet from the pressure chamber. This difference in pressure effects the very rapid operation of the system or method in the de-alcoholizing of beer. Under some conditions the condenser itself can be eliminated, such as when the pressure device 4 is arranged to produce a pressure in the circuit sufficient to cause the precipitation of the alcohol. It should be understood that under such conditions the outlet from the pressure chamber is much more restricted in order to maintain the vaporization zone at a relatively low pressure.

It will be apparent from the foregoing that the process as a whole operates at a low temperature and that the alcohol constituents can be vaporized or removed with great rapidity and with a minimum heating of the beer. Furthermore the closed system protects against contamination from the atmospheric air and permits a wide variation in the gas pressure and retains within itself such constituents as may be contained in the beer and the removal of which might effect the flavor or quality of the liquid product.

I have found that the temperature of the gas may be raised quite high by the reheater without effecting any increase in temperature in the beer due to the rapid evaporation and the instantaneous cooling effect caused immediately upon contact of the two fluids. In fact, it is possible to lower the temperature of the liquid even though the gas is admitted at a relatively high temperature.

I do not intend to be limited to the precise details shown nor to the exact manner of procedure as described.

I claim:

1. The method of treating a fluid material for removing therefrom a volatile constituent, which comprises moving a definite, constant charge of gas in a completely closed circuit of fixed volume, at one point in the circuit projecting the fluid to be treated in the form of a substantially complete fluid curtain, deflecting the fluid downwardly away from said curtain, passing the gas upwardly through said fluid curtain and away from said deflected body of fluid, the gas picking up the volatile constituent in the form of a vapor, at another point in the circuit cooling the gas to condense out the volatile constituent, at another point in the circuit reheating the gas for repeated passage up through said fluid curtain, between said cooling point and said reheating point imparting an impelling force to the gas so as to maintain a relatively low pressure at the cooling point and a relatively high pressure at the reheating point, said completely closed circuit maintaining said charge of gas in an unvarying body against the introduction of atmosphere or extraneous gases and out of contact with liquid washes, whereby the volatile flavoring constituents of said fluid material are retained in said charge of gas.

2. The method of treating a liquid material for removing therefrom a volatile constituent, which comprises moving a body of gas in a closed circuit, heating the gas at one point in the circuit, at another point in the circuit projecting the liquid material in a sheet or curtain of drops substantially horizontally, simultaneously projecting the heated gas in a sheet or curtain below the sheet or curtain of liquid substantially horizontally but slightly upwardly, deflecting the liquid downwardly while the gas is passed upwardly through the sheet or curtain of drops, the gas picking up the volatile constituent in the form of a vapor, at another point in the circuit cooling the gas to condense out the volatile constituent therefrom, passing the gas from said cooling point to the heating point in the circuit where the gas is reheated for repeated projection below said curtain of liquid, and at a point in the circuit between the absorption zone where the gas picks up the volatile constituents and the heating point where the gas is re-heated imparting an impelling force to the gas for maintaining the absorption zone at a relatively low pressure for increased absorption, and for maintaining a relatively high pressure at the heating point of the circuit, said body of gas consisting of a constant unvarying charge, and said circuit being of fixed volume and closed to atmosphere and to the introduction of extraneous gases, whereby the volatile flavoring constituents of said liquid material is retained in said body of gas.

3. In apparatus of the kind described, a mixing chamber, a spreading disc in said mixing chamber, inlet means for directing the fluid upon said spreading disc, a gas pressure chamber below said spreading disc the gas chamber having a restricted outlet to said mixing chamber, an impeller arranged at said outlet for forcibly impelling the gas into the mixing chamber, a condenser for condensing out the vapor in the gas and for contracting the volume of gas, a conduit joining the condenser to the mixing chamber, a reheater, a conduit joining the condenser to the reheater, means arranged between the condenser and the reheater for drawing the gas from the mixing chamber and forcing it to the pressure chamber, and a third conduit connecting said heater with said gas chamber.

In witness whereof I hereunto subscribe my name this 28th day of July, A. D. 1919.

HARRY E. LA BOUR.